March 19, 1940.   H. M. ARNOLD   2,194,000
SUPERHEATED STEAM ENGINE
Filed Dec. 1, 1937   2 Sheets-Sheet 1
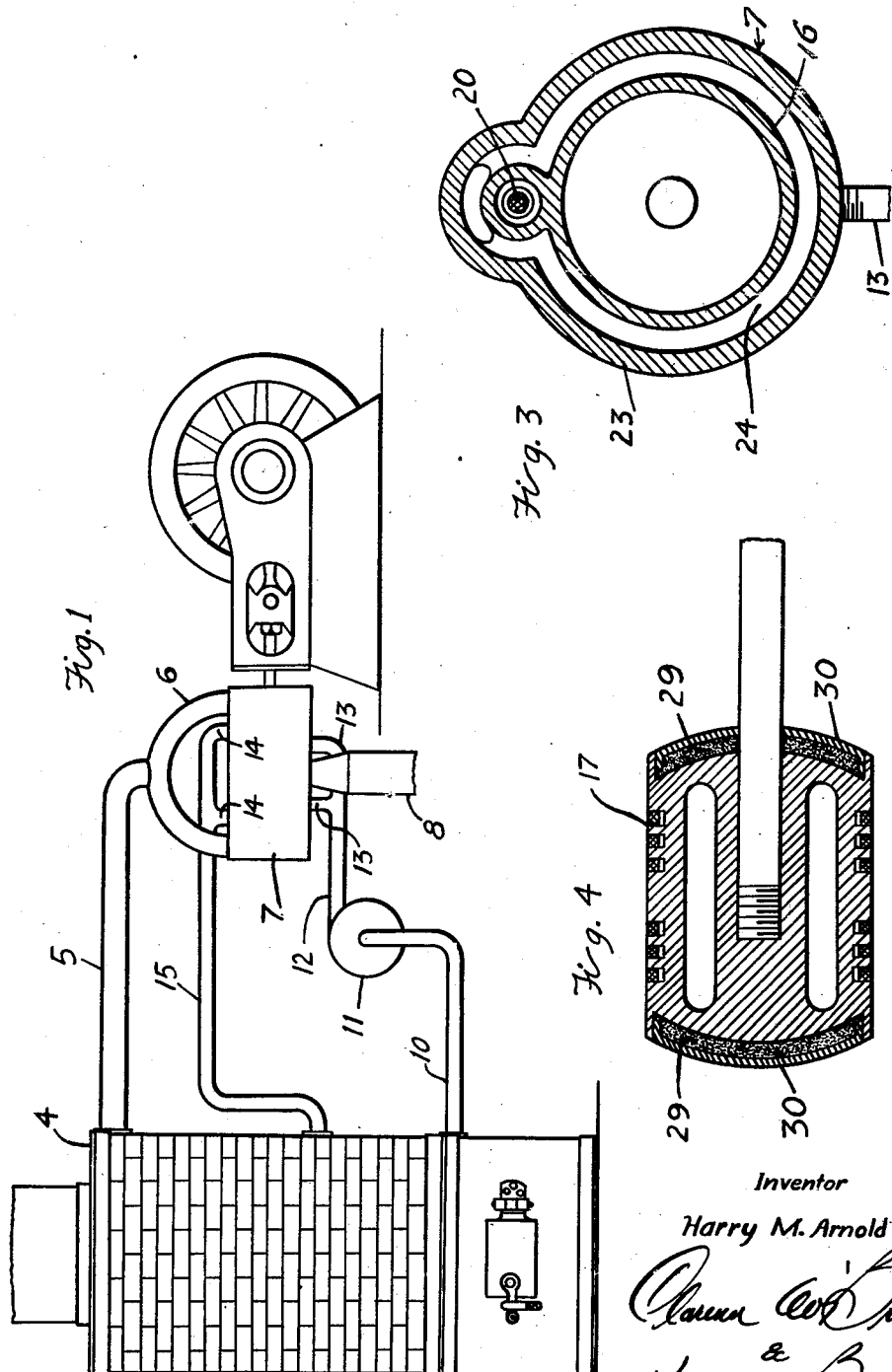
Inventor
Harry M. Arnold
Attorneys

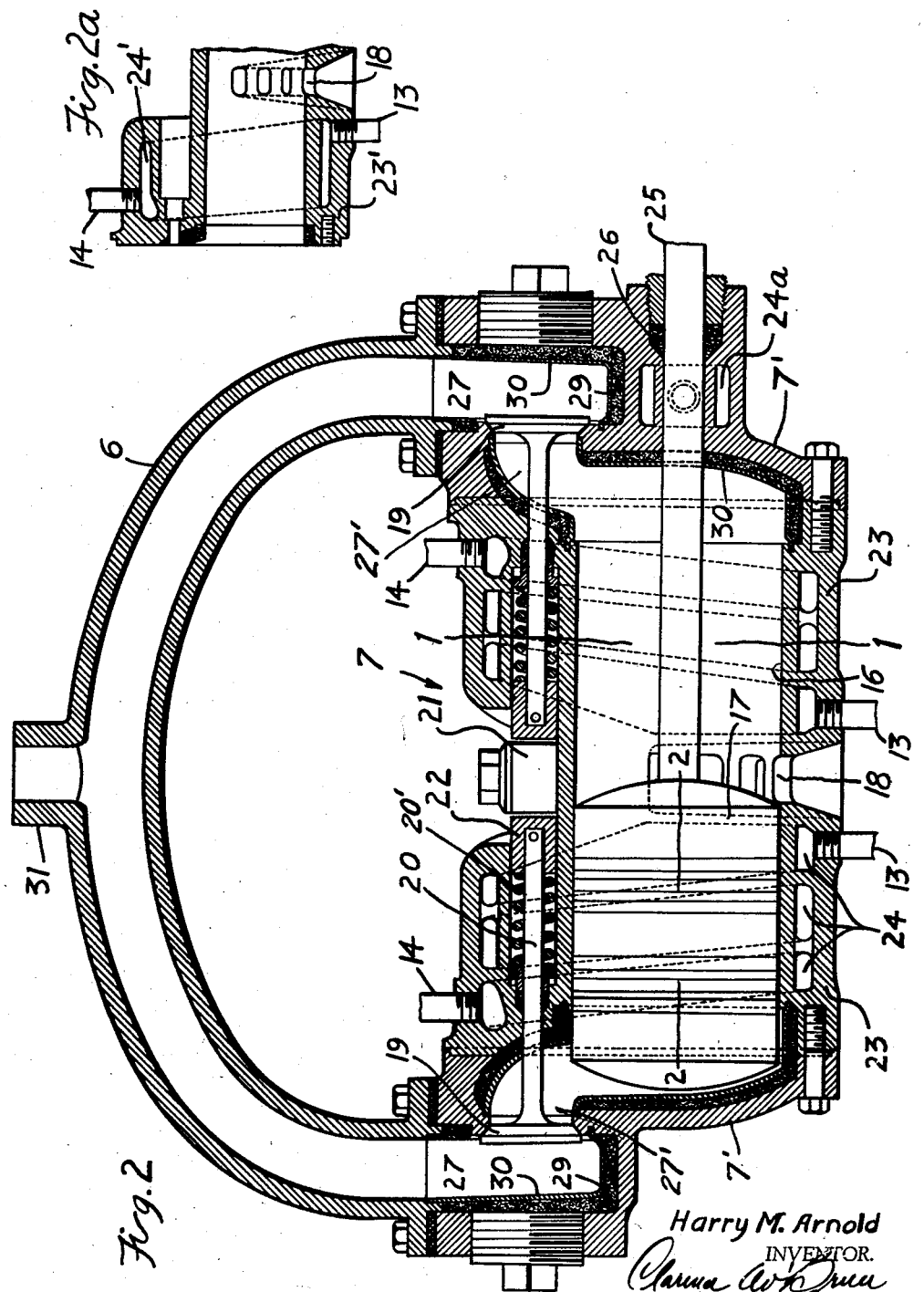

Patented Mar. 19, 1940

2,194,000

UNITED STATES PATENT OFFICE 2,194,000

SUPERHEATED STEAM ENGINE

Harry M. Arnold, Douglas, Wyo.

Application December 1, 1937, Serial No. 177,640

1 Claim. (Cl. 121—125)

This invention relates to a steam engine using superheated steam, the general object of the invention being to provide a circulating system for the cylinders and packing glands of the engine which is so constructed and arranged that it will keep the parts at a temperature that proper lubrication of the various parts of the engine can be obtained, and to provide insulation for all parts of the engine contacted by the superheated steam to prevent heat losses from the superheated steam.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a diagrammatic view of the engine and water heating means and the means for circulating the superheated steam and the boiler water.

Figure 2 is a longitudinal sectional view through the engine.

Figure 2a is a fragmentary longitudinal sectional view through a portion of an engine provided with a slightly different form of water jacket.

Figure 3 is a section on the line 1—1 of Figure 2.

Figure 4 is a section on the line 2—2 of Figure 2 and showing the insulation of the piston.

In these drawings and referring to Figure 1, the numeral 4 indicates a conventional form of furnace which contains a firebox, boiler and superheater for superheating the steam created in the boiler. The engine is shown generally at 7 and has a manifold 6 of arcuate form which is connected with the inlet chambers of the engine and superheated steam is conducted from the superheater of the furnace through the pipe 5 into the top of the manifold 6. The steam exhausts from the engine through the exhaust 8. A pump 11 is connected by a pipe 10 to the lower part of the boiler and the outlet of the pump is connected by a pipe 12 with the branches 13 which are connected with the water jackets of the engine and the water after passing through the jackets passes through the branches 14 into the pipe 15 which delivers the water into another portion of the boiler, this portion being preferably located above the connection of the pipe 10 with the boiler.

As shown in Figures 2 and 3 the engine includes the cylinders 16 having the centrally arranged common exhaust means 18 with which the exhaust 8 of Figure 1 communicates and the heads 7' are bolted to the ends of the cylinder 16. One head has a passage therein for the piston rod 25 of the piston 17 and this head is provided with a packing means 26 for the rod 25. Jackets 23 surround the cylinder and form the substantially spiral passageways 24 therein, to the inner end of each of which a branch pipe 13 is connected with the branch 14 connected to the outer end of the passageways. A water chamber 24a forms a jacket for the bearing part of the shaft 25 and this chamber is suitably connected with the jacket 23 so that water will circulate through the same to cool the gland 26.

Instead of having the water jackets constructed as shown in Figure 2 they may be constructed as shown in Figure 2a in which the jacket 23' is provided with a single passageway 24'.

The heads 7' are formed with the intake chambers 27 with which the manifold 6 is in communication, the central upper portion of the manifold having a connection 31 with which the pipe 5 is connected. Curved passages 27' connect the chambers with the outer ends of the cylinders, said outer ends being located in the heads 7' and valves 19 control the flow of steam from the chambers 27 into the passages. The stems 20 of the valves extend toward each other and pass through spring chambers formed in the engine between a part of the cylinders and a part of the water jacket and have heads 22 connected to their adjacent ends which are engaged by the cam 21 which is suitably actuated from a part of the engine to open the valves at the desired time. Springs 20' are located in the chambers and engage the heads 22 to hold the valves 19 in closed position.

It will, of course, be understood that the steam entering one end of the engine will press the piston to the opposite end and that the piston during this movement will uncover the exhaust ports 18 so that the steam can escape and then the valve 19 will close and the other valve 19 will open so that steam will enter the other end of the engine to force the piston in the opposite direction so that the piston is reciprocated by the superheated steam alternately entering the two ends of the engine.

In order to prevent the parts of the engine contacted by the incoming superheated steam from absorbing heat from the steam and thus cooling the same, I provide heat non-conductive material on all the parts of the engine contacted by the steam as it enters the engine. As will be seen from Figure 2 the ends of the cylinders, the walls of the passages 27' and the walls of the chambers 27 are covered with heat non-conducting material 29 and this material is covered by thin plates 30 of heat resisting alloy and as shown in Figure 4 the ends of the piston 17 are also covered by this heat resisting material 29 and the plates 30.

The manifold 6 is also formed of heat resisting alloy and the pipe 5 is suitably covered with insulation material.

From the foregoing it will be seen that boiler water is passed through the cooling system of the engine so that the walls of the engine are not heated as highly as the steam inside the engine so that the proper lubrication of the engine parts can be obtained and all parts of the engine, or approximately so, contacted by the incoming superheated steam, are insulated so as to prevent heat losses from the steam. As will be seen from Figure 2 the insulation extends a distance over the internal wall of each end of the cylinder so that the steam will not contact the bare wall of the cylinder until the piston has moved inwardly a certain amount. After this occurs the steam will contact the bare wall of the cylinder so that some of the heat of the steam will pass through the wall to be taken up by the circulating water in the water jacket but as this water is returned to the boiler, the loss of heat from the expanding steam is made use of in the boiler.

This improved engine promotes expansion of very high temperatures by superheated steam as heat losses are prevented in the steam before expansion begins within the engine.

While the drawings show the invention applied to an engine of the type shown in Figure 2, it will of course be understood that the invention can be used with other types of engines such as the single acting engine as well as in cylinder constructions embodying two or more cylinders in one cylinder block.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a steam engine of the class provided with a water circulating system for the cylinder thereof, a body having a cylinder therein, a steam inlet chamber in one end thereof and a curved passage connecting the chamber with an end of the cylinder, means for introducing superheated steam into said chamber, a valve seat at the junction of the passage with the chamber, a piston in the cylinder, valve means having a part for engaging the seat, said valve means including spring means for normally holding the valve means in closing position, said body having a chamber therein in which the spring means are located and said chamber with the spring means being cooled by the water circulating system, heat non-conducting material covering the internal walls of the chamber and the cylinder end and the end of the piston contacted by the steam, such material extending an appreciable distance along the internal walls of the cylinder to prevent the steam contacting the uncovered wall of the cylinder until the piston has been moved by the expanding steam to a certain position.

HARRY M. ARNOLD.